March 24, 1970
B. ADINOFF
3,502,380
BEARING STRUCTURE
Filed Dec. 14, 1967
2 Sheets-Sheet 1
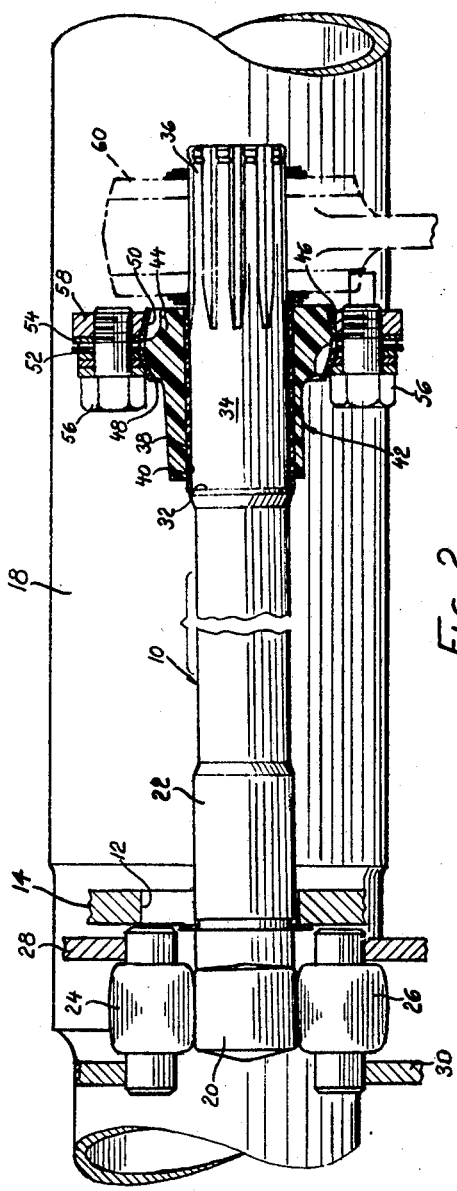
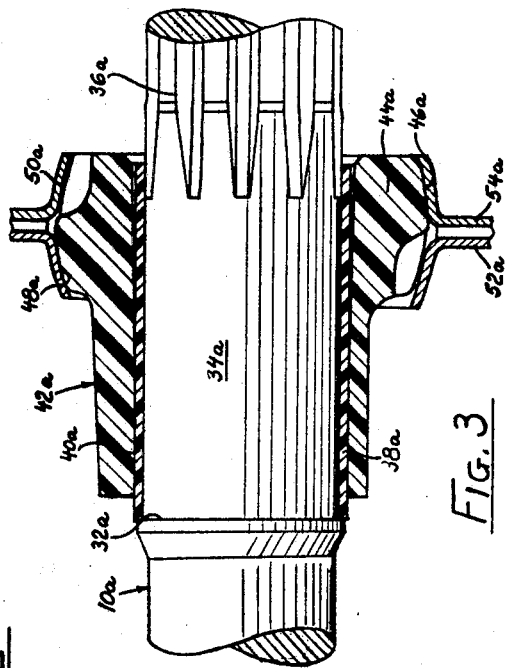
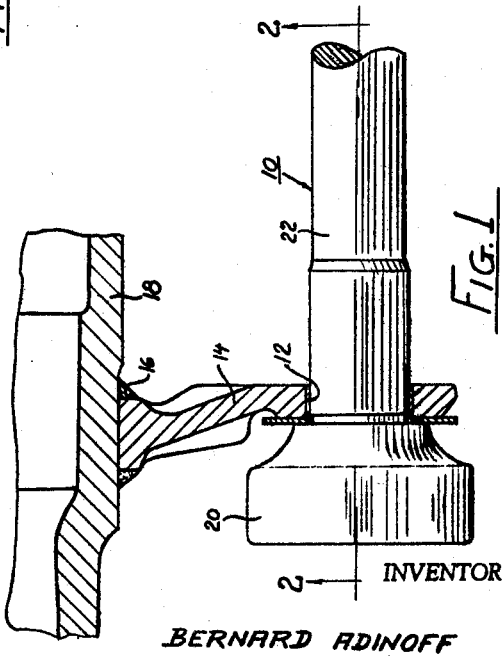
INVENTOR
*BERNARD ADINOFF*
BY *JOHN R. BRONAUGH*
ATTORNEY March 24, 1970  B. ADINOFF  3,502,380
BEARING STRUCTURE
Filed Dec. 14, 1967  2 Sheets-Sheet 2
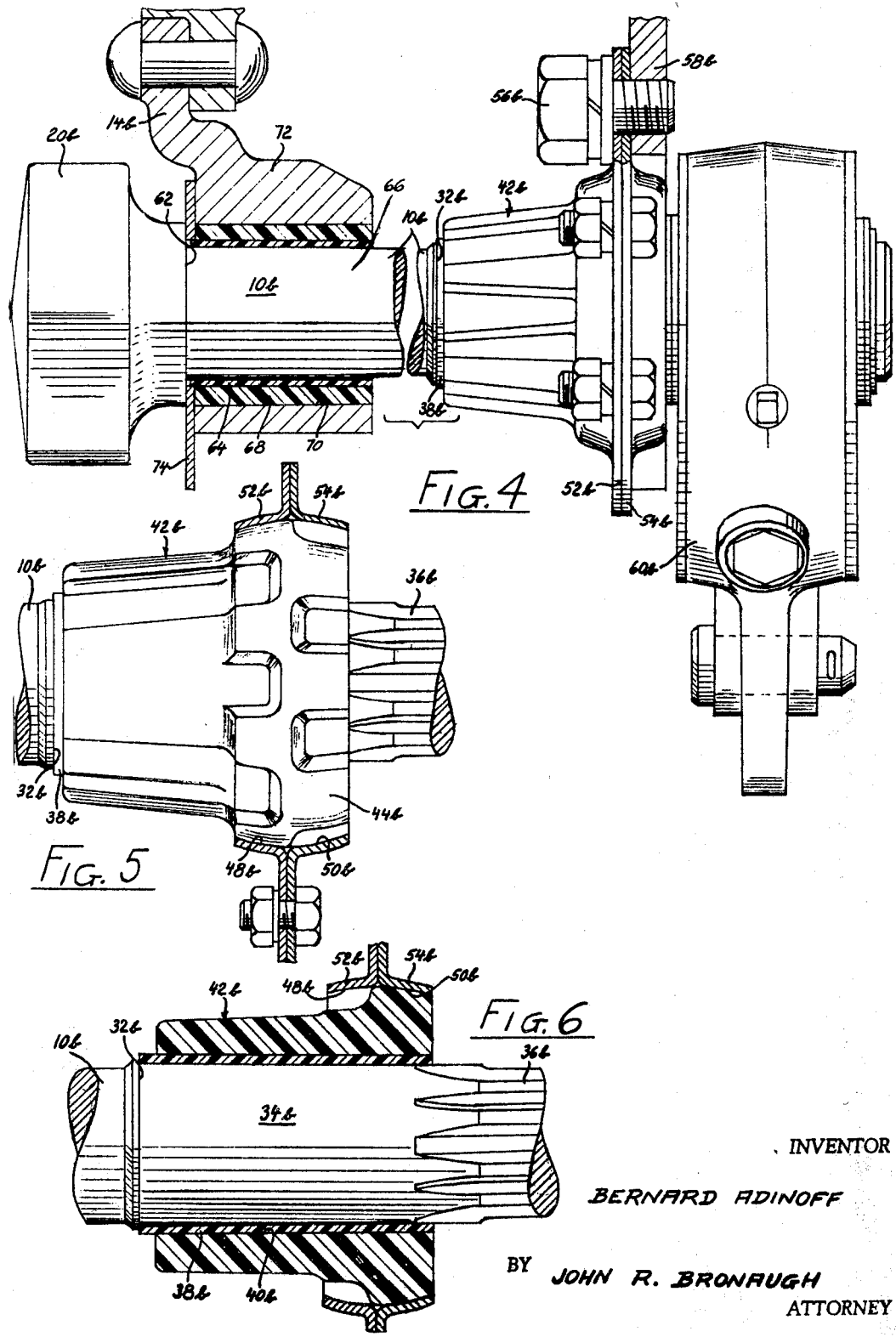
INVENTOR
BERNARD ADINOFF
BY JOHN R. BRONAUGH
ATTORNEY

United States Patent Office 3,502,380
Patented Mar. 24, 1970

3,502,380
BEARING STRUCTURE
Bernard Adinoff, Southfield, Mich., assignor, by mesne assignments, to Rockwell-Standard Company, Pittsburgh, Pa., a corporation of Delaware
Filed Dec. 14, 1967, Ser. No. 690,496
Int. Cl. F16c 27/00, 33/00
U.S. Cl. 308—238      17 Claims

ABSTRACT OF THE DISCLOSURE

A dry bearing structure for brake cam shafts and the like in which the shaft has a synthetic plastic sleeve (preferably of the thermoplastic acetal resin known as "Delrin") fixed thereto and that sleeve is journalled within the bore of the synthetic plastic rigid support body (preferably formed of the polyamide resin nylon).

BACKGROUND AND SUMMARY OF INVENTION

Bearing structures for the cam shaft of cam actuated brakes as heretofore constructed have required periodic lubrication to maintain satisfactory performance. One of the more satisfactory forms of such prior brake cam shaft bearing constructions is that illustrated, United States Patent No. 2,923,579, issued Feb. 2, 1960 to W. F. Scheel, for "Shaft Support." In that arrangement the metal cam shaft is journalled in spaced bearings formed of nylon. Under normal operating conditions of such bearings, however, periodic lubrication is essential for maintenance of satisfactory brake actuation, since moisture and dirt will enter the bearings and the lubricant in the bearings will leak out. Bearing lubrication is very expensive, not only in terms of labor and materials required for actual lubrication, but also in terms of the lost productive time of the vehicle in which the brake is embodied. With the large number of bearings which must be lubricated on any vehicle, lubrications of the cam shaft bearing may be inadvertently omitted. If the brake cam shaft bearing is not properly periodically lubricated, malfunctioning of the brake may occur, due first to excessive friction and ultimately seizure, causing brake drag and eventual over-heating of the brake at the bearing. In addition, the lubricated bearing structures are expensive since seals must be provided to keep out water and dirt and keep in the lubricant. Such seals, in time, deteriorate providing a further maintenance problem.

The present invention eliminates all of these difficulties by providing an improved bearing structure which completely eliminates the need for lubrication and seals while providing long trouble-free operative life without maintenance.

Accordingly, it is a primary object of the present invention to provide an improved unsealed brake cam shaft bearing structure requiring no lubrication.

A further object of the present invention is to provide an improved brake cam shaft bearing structure in which the cam shaft is supported in a rigid synthetic plastic body and isolated therefrom by a sleeve of a synthetic plastic fixed to the cam shaft and in bearing contact with a bore in the plastic body.

A still more specific object of the present invention is to provide an improved brake cam shaft bearing structure in which the cam shaft is supported in a body of nylon or the like and isolated therefrom by a sleeve of Delrin or the like, fixed to the cam shaft and journalled within the nylon body so that the relative rotation takes place between the exterior of the Delrin sleeve and the bore in the nylon body.

These and other objects of the present invention will become more fully apparent by reference to the appended claims and as the following detailed description proceeds in reference to the accompanying drawings.

BRIEF DESCRIPTION OF DRAWINGS

FIGURE 1 is a fragmentary sectional view taken in a plane defined by the axes of the axle and cam shaft illustrating the invention embodied in a floating cam shaft brake;

FIGURE 2 is a fragmentary sectional view of the structure of FIGURE 1 taken in a plane through the cam shaft axis and normal to the plane of FIGURE 1, that is, substantially along the line 2—2 of FIGURE 1;

FIGURE 3 is a fragmentary view similar to the right end of FIGURE 2 illustrating a second embodiment of the invention;

FIGURE 4 is a view similar to FIGURE 3 illustrating the embodiment of the present invention in a substantially rigidly supported cam shaft brake;

FIGURE 5 is a view, partially in section, illustrating the exterior of the FIGURE 4 cam shaft support itself; and FIGURE 6 is a diametral section through the FIGURE 4 cam shaft support.

PREFERRED EMBODIMENT

Referring now in detail to the drawings, the present invention is illustrated in FIGURES 1 and 2 as embodied in a cam actuated, floating cam shaft brake of the type illustrated in United States co-pending application Ser. No. 551,818, filed Mar. 28, 1966, by Nelson R. Brownyer for "Floating Cam Brake Having Brake Shoe Linings of Different Volumes."

As is more fully illustrated in said co-pending application, brakes of this type are provided with a cam shaft 10 extending freely through an enlarged aperture 12 in a spider 14 which is fixed as by welding at 16 to the axle beam or housing 18. A cam 20 is formed integral with or fixed to the end of the shank 22 of the cam shaft 10. As is illustrated in FIGURE 2, the cam 20 is disposed between a pair of rollers 24 and 26, journalled on the adjacent ends of the brake shoe webs 28 and 30 of the pivoted brake shoes (not fully shown). The complete brake structure and its operation is more fully illustrated and described in the aforesaid application Ser. No. 551,818, to which reference is made in the event a more complete illustration and explanation is found to be necessary.

Referring now to FIGURE 2, the end of the shank 22 of the cam shaft 10 remote from the cam 20 is formed, in series with a radially extending shoulder 32, a cylindrical portion 34 and a splined end portion 36. The external diameter of the splined portion 36 is of no greater diameter than the cylindrical portion 34. Fixed on the cylindrical portion 34 in axial abutment with the radial shoulder 32 by a press or interference fit is a plastic sleeve 38 preferably formed of Delrin or like plastic material. Delrin is a proprietary polyacetal material available from E. I. du Pont de Nemours & Co. The sleeve 38 may be either injection molded or extruded. If it is formed by injection molding, it is formed of Delrin No. 500. If it is formed by extrusion, it is formed of Delrin No. 100. In one practical embodiment, the sleeve 38 is approximately 2½" long and has a wall thickness of about .050". The tolerance of the external diameter of the portion 34 and the internal diameter of the sleeve 38 is such as to provide an interference fit up to about 0.10". By this construction it is assured that the Delrin sleeve 38 will remain fixed relative to the cam shaft 10 during actuation of the brake. While Delrin is preferred due to its high strength, stiffness, toughness and resilience over a wide temperature range, its good dimensional stability in the presence of moisture, high heat distortion temperature and good abrasion resistance, other synthetic bearing materials such as nylon and Teflon may be suitable for certain applications.

The sleeve 38 is rotatably received within the bore 40 of the cam shaft support 42. The cam shaft support 42 is preferably formed of nylon or the like. Its bore 40 is cylindrical and dimensioned so that its as constructed internal diameter is in the order of .006″ greater than the maximum outside diameter of the sleeve 38 when assembled on the shaft portion 34. This construction provides the necessary free fit of the sleeve 38 within the bore 40 to assure that relative rotation will take place only between sleeve 38 and support 42, not also between sleeve 38 and shaft portion 34. The difficulties involved in the use of nylon to metal and nylon to nylon bearings, as described in United States Patent 2,675,283, issued Apr. 13, 1954, to John B. Thompson for "Bearing" are thus avoided.

The cam shaft support 42 is formed with a radially enlarged flange at 44, having a segmental spherical external surface 46, mating with the complementary internal spherical surfaces 48 and 50 formed on the cam shaft support brackets 52 and 54 which are secured by a screw 56 to a flange 58 fixed to and projecting from the axle beam 18.

A brake lever 60 is internally splined and received upon the splined end 36 of the cam shaft 10 in the conventional manner. Likewise, lever 60 is conventionally connected at its opposite ends to the output element of a brake actuating motor (not shown) mounted on the axle 18.

In operation, actuation of the brake actuating motor applies a force on the other end of the lever 60 causing it to pivot the cam shaft 10 about its axis, thereby rotating the cam 20 to separate the rollers 24 and 26, and bringing the brake shoes into engagement with the brake drum. In this actuation, the cam shaft support 42 remains fixed axially and circumferentially relative to the axle beam 18 while canting slightly to accommodate the cam lateral float and the sleeve 38 remains fixed relative to the cam shaft 10. Due to the properties of synthetic bearing plastics such as nylon and Delrin, the engaged cylindrical surfaces of the sleeve 38 and the support 42 provide a low friction bearing support for the cam shaft 10 which requires no lubrication and which will continue to operate properly even with moisture, dirt, and salt penetrating there between.

Tests of the structure shown in FIGURES 1 and 2 have established that that structure will operate satisfactorily through 500,000 cycles of operation without excessive wear and without lubrication. This is the equivalent of about five years of normal operation.

SECOND EMBODIMENT

The embodiment of FIGURE 3 is in all respects identical with the embodiment of FIGURES 1 and 2 with the exception that the bore 40a of the cam shaft support 42a is tapered as shown in FIGURE 3. This construction is easier and less expensive to mold and under test has proved to be as satisfactory as the cylindrical bore form shown in FIGURE 2. To avoid unnecessary repetition, the parts of the FIGURE 3 embodiment have been indicated with the same reference numeral as their corresponding parts in the FIGURE 2 embodiment but with the suffix "a."

THIRD EMBODIMENT

The third embodiment of this invention illustrated in FIGURES 4 through 6 inclusive illustrates the application of the present invention to a cam actuated brake of the type in which the cam shaft is substantially rigidly journalled with respect to the axle rather than mounted for floating motion as in the first two embodiments. Such a cam shaft support structure in accord with the prior art is illustrated in the aforesaid United States Patent No. 2,923,579 of Scheel.

To avoid repetition, the parts of the third embodiment of FIGURES 4 through 6 have been assigned reference numerals identical with the corresponding parts of the embodiment of FIGURES 1 and 2, but with the suffix "b."

Referring now to FIGURES 4 through 6, the cam shaft 10b is formed with a radial shoulder 62 adjacent the cam 20b. A synthetic plastic sleeve 64 is mounted on the portion 66 of cam shaft 10b adjacent shoulder 62 and on the opposite side thereof from the cam 20b. The sleeve 64 is preferably formed of Delrin and is received on the 64 in an interference fit. The sleeve 64 is rotatably received within a synthetic plastic bushing 68 fixed in a through bore 70 in the boss 72 of the spider 14b.

The bushing 68, having a force fit within the bore 70, is fixed relative to the spider 14b and the sleeve 64 having a force fit with the portion 66 is fixed relative to the cam shaft 10b. Relative rotation takes place between the adjacent cylindrical surfaces of the sleeve 64 and the bushing 68, thereby providing a low friction, wear resistant bearing for the cam shaft 10b, relative to the spider 14b, which requires no lubrication.

The opposite end of the cam shaft 10b is, as is best illustrated in FIGURE 6, of identical construction to that of the cam shaft 10 of the embodiment of FIGURES 1 and 2, having preferably a Delrin sleeve 38b fixed thereon by an interference fit in abutment with its radial shoulder 32b. The Delrin sleeve 40b is rotatably received within a nylon cam support 42b which is constructed and mounted in the same way as the cam support 42 is constructed and mounted in the embodiment of FIGURES 1 and 2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. A lubrication free shaft mounting assembly comprising:
   a rigid metal shaft having an external cylindrical surface thereon,
   a cylindrical plastic sleeve non-rotatably mounted on said external cylindrical surface of said shaft,
   a support,
   an annular shaft support member non-rotatably secured to said support,
   said shaft support member having a smooth circumferentially continuous smooth bore therethrough,
   said sleeve being rotatably received in said bore,
   said sleeve and said shaft support member being formed of materials selected to jointly provided a low friction interface between said sleeve and said bore in the absence of lubricants,
   whereby rotation of said shaft results in relative rotation between only said sleeve and said bore.

2. A lubrication free shaft mounting assembly as defined by claim 1 in which said shaft support member is formed of a plastic material different than the plastic material of said sleeve.

3. A lubrication free shaft mounting assembly as defined by claim 2 in which the non-rotational connection between said sleeve and said shaft is provided by an interference fit therebetween, the material of which said sleeve is formed being abrasion resistant and having good dimensional stability in the presence of moisture.

4. A lubrication free shaft mounting assembly as defined by claim 3 in which the material of which said sleeve is formed is Delrin or like plastic material.

5. A lubrication free shaft mounting assembly as defined by claim 4 in which the material of which said annular member is formed is nylon.

6. A lubrication free shaft mounting assembly as defined by claim 2 in which said sleeve is rotatably received in said bore with substantial radial clearance therebetween.

7. A lubrication free shaft mounting assembly as defined by claim 6 in which said interference fit between said sleeve and said shaft is up to about 0.010 inch and said clearance between said sleeve and said bore is approximately 0.006 inch.

8. A lubrication free shaft mounting assembly as defined by claim 7 in which the material of which said sleeve is formed is abrasion resistant and has good dimensional stability in the presence of moisture.

9. A lubrication free shaft mounting assembly as defined by claim 8 in which the material of which said sleeve is formed is Delrin or like plastic material.

10. A lubrication free shaft mounting assembly as defined by claim 9 in which the material of which said annular member is formed is nylon.

11. In a cam actuated brake mechanism including brake support structure, a cam shaft, and a cam secured to the cam shaft for rotation therewith, a lubrication free shaft mounting assembly as defined by claim 2 in which said shaft is the cam shaft of the cam actuated brake mechanism.

12. A lubrication free shaft mounting assembly as defined by claim 11 in which said sleeve is rotatably received in said bore with substantial radial clearance therebetween.

13. A lubrication free shaft mounting assembly as defined by claim 12 in which said annular member and said sleeve are at the end of said cam shaft remote from said cam.

14. A lubrication free shaft mounting assembly as defined by claim 13 in which the material of which said sleeve is formed is Delrin or like plastic material and the material of which said annular material is formed is nylon.

15. A lubrication free shaft mounting assembly as defined by claim 12 in which said annular member and said sleeve are at the end of said cam shaft adjacent said cam.

16. A lubrication free shaft mounting assembly as defined by claim 15 in which the material of which said annular member is formed is nylon and the material of which said sleeve is formed is Delrin or like plastic material.

17. A lubrication free shaft mounting assembly as defined by claim 12 in which said annular bore is frusto-conical and in which said bearing surface is cylindrical.

References Cited

UNITED STATES PATENTS

| | | | |
|---|---|---|---|
| 2,675,283 | 4/1954 | Thomson | 308—238 |
| 2,892,662 | 6/1959 | Scheel | 308—36.1 |
| 3,108,830 | 10/1963 | Fierstine | 308—26 XR |
| 3,275,338 | 9/1966 | Herbenar et al. | 308—26 XR |
| 3,304,136 | 2/1967 | Muller | 308—36.1 |

KENNETH W. SPRAGUE, Primary Examiner